United States Patent

Umeda et al.

Patent Number: 5,666,184
Date of Patent: Sep. 9, 1997

[54] PROGRESSIVE POWER LENS

[75] Inventors: Toshiaki Umeda, Tokyo; Fumio Takahashi, Ibaraki-ken, both of Japan

[73] Assignee: Nikon Corporation, Tokyo, Japan

[21] Appl. No.: 262,486

[22] Filed: Jun. 20, 1994

[30] Foreign Application Priority Data

Jun. 29, 1993 [JP] Japan ................... 5-184411

[51] Int. Cl.⁶ .................................................. G02C 7/06
[52] U.S. Cl. ............................................................ 351/169
[58] Field of Search ........................................... 351/169

[56] References Cited

U.S. PATENT DOCUMENTS

| Re. 34,132 | 11/1992 | Kitani | 351/169 |
|---|---|---|---|
| 3,785,724 | 1/1974 | Cretin-Maitenaz | 351/169 |
| 4,606,622 | 8/1986 | Fueter et al. | 351/169 |
| 4,762,408 | 8/1988 | Shinohara | 351/169 |

FOREIGN PATENT DOCUMENTS

| 0301917 | 2/1989 | European Pat. Off. |
| 0452802 | 10/1991 | European Pat. Off. |
| 47-9626 | 3/1972 | Japan |
| 64-5682 | 1/1989 | Japan |
| 2-39767 | 9/1990 | Japan |
| 2261527 | 5/1993 | United Kingdom |

*Primary Examiner*—Georgia Y. Epps
*Assistant Examiner*—Jordan M. Schwartz
*Attorney, Agent, or Firm*—Shapiro and Shapiro

[57] ABSTRACT

A progressive power lens comprising, along a principal meridional curve dividing a lens refracting surface into a nasal side region and a temporal side region, a portion for distant vision having a refracting power corresponding to a distant view, a portion for near vision having a refracting power corresponding to a near view and an intermediate portion, located between the portion for distant vision and the portion for near vision, for continuously connecting the refracting powers of the portions for distant and near vision, wherein the principal meridional curve is displaced with respect to a vertical direction in the state with the lens worn toward the nasal side in the intermediate portion and the portion for near vision, and an astigmatic difference distribution in a horizontal direction in the worn state is symmetrical with respect to the principal meridional curve in the intermediate portion and asymmetrical with respect to the principal meridional curve in the portion for near vision.

13 Claims, 3 Drawing Sheets

POINT WHICH LINE OF SIGHT PASSES THROUGH IN THE CASE WHERE BOTH EYES GAZE TOWARD RIGHT SIDE AT INFINITY

PROGRESSIVE POWER LENS

BACKGROUND OF THE INVENTION

1. Field of the Invention

The present invention relates to a progressive power lens used to assist an accommodation power of an eye.

2. Related Background Art

As spectacle lenses for assisting an accommodation power when an accommodation power of an eye becomes too weak to see a near point, various progressive power lenses have been known. Such a progressive power lens has a distant vision correcting region (referred to as a "portion for distant vision" hereinafter), a lower near vision correcting region (referred to as a "portion for near vision" hereinafter) and a progressive region (referred to as an "intermediate portion" hereinafter) located between the above upper and lower portions in which a refracting power is continuously changed. When worn by a user, the portion for distant vision is located above the portion for near vision. In the present invention, it is to be noted that "upper", "lower", "horizontal" and "vertical" are used to refer to positions of the progressive power lens in the state that it is actually worn by a user. For example, the lower portion of the portion for distant vision is a position within the portion for distant vision close to the intermediate portion. Also, the difference between the refracting power of the portion for near vision and the refracting power of the portion for distant vision is called an additional power.

In a progressive power lens of this type, in general, when wide clear vision areas of the portions for near and distant vision are kept and coupled by the progressive power range, lens aberrations are concentrated on side areas of the progressive power range. As a result, blurring and distortion of an image occur in these side areas. Therefore, when a user wears spectacles formed of these power lenses and shifts his eyes laterally, he perceives the distortion of an image as the fluctuation of the image and has an unpleasant feeling.

In order to solve such a problem of visual characteristics, in known progressive power lenses, various designs and evaluations have been made from a variety of viewpoints.

FIG. 1 is a schematic plan view showing the divisions of regions of a progressive power lens designed symmetrically. The progressive power lens has, in the state with it worn by a user, an upper portion F for distant vision, a lower portion N for near vision and an intermediate portion P in which the refracting power is changed continuously between the upper and lower portions F and N. As for the shape of a lens surface, the intersecting curve MM' of the object-side lens surface and a cross section along a meridian line passing through approximately the center of the lens surface vertically from top to bottom is used as a reference line for expressing specifications such as the additional power of the lens, and is also used as an important reference line in the lens design. In the thus designed progressive power lens, the center OF of the portion F for distant vision, an eye point E for distant vision and the center (eye point) ON of the portion N for near vision are located on the center line MM' as the reference.

Further, as shown in FIG. 2 (later discussed in connection with the invention), in consideration of the fact that the portion N for near vision comes close to a nasal side when worn by a user, another progressive power lens has a portion N for near vision and an intermediate portion P arranged asymmetrically (hereinafter referred to as an "asymmetrical type progressive power lens").

Also, in such an asymmetrical type progressive power lens, a center line MM' consisting of the intersecting curve of an object-side lens surface and a cross section passing through a center OF of a portion F for distant vision, an eye point E for distant vision and a center ON of a portion N for near vision is used as a reference line. In the present invention, these reference lines will be referred to as "principal meridional curves" hereinafter.

Thus, in the symmetrically designed progressive power lens (hereinafter referred to as the symmetrical type progressive power lens), the principal meridional curve MM' divides the lens surface symmetrically into a nasal side region and a temporal side region. On the other hand, in the asymmetrical type progressive power lens, the principal meridional curve MM' is displaced toward a nasal side in the intermediate portion P and the portion N for near vision.

FIG. 3 shows an astigmatic difference distribution of a known symmetrical type progressive power lens. Isoastigmatic difference curves in FIG. 3 are curves formed by linking points which have astigmatic differences of 0.50 diopter. An area including a principal meridional curve sandwiched by the isoastigmatic difference curves is a clear vision area.

In general, for looking at an object with both eyes by the use of such symmetrical type progressive power lenses as spectacles, the lenses are rotated by about 8° to 10°, as shown in FIG. 4, in consideration of the fact that both eyes are converged in accordance with movement of the line of sight from a distant view to a close-range view. Specifically, when setting the lenses in a frame of the spectacles in a manner as indicated by broken lines in the drawing, the principal meridional curve MM' of the lens on the right eye side is inclined counterclockwide at the angle of about 8° to 10° with respect to the vertical direction in the worn condition while that of the lens on the left eye side is inclined clockwise at the same angle with respect to the same direction.

As a result, when looking at an object with both eyes, the right and left eyes look at the object through areas having different astigmatic differences. Therefore, for example, when both eyes look toward the right side at infinity, the left eye looks through an area having a larger astigmatic difference as compared to the right eye, so that the user feels uncomfortable.

More specifically, with reference to FIG. 4, when both eyes look at the right side at infinity, positions through which the lines of sight of the right and left eyes pass are points A and B respectively. The points A and B are on a horizontal line C indicated by a broken line. As mentioned above, the meridional lines MM' of the lenses on the right and left eye sides are inclined counterclockwise and clockwise respectively, so that the point A is located within the clear vision area while the point B is located outside that. Thus, since the left eye looks at the object through the area having the larger astigmatic difference as compared to the right eye, it is preferable to lessen the astigmatic difference in that area.

Therefore, in order to avoid uncomfortable feelings in the worn state, various asymmetrical type progressive power lenses have been proposed, in which a principal meridional curve is displaced toward the nasal side in an intermediate portion and a portion for near vision to secure the symmetry of an aberration distribution in the horizontal direction in the worn state thereby to improve visual performance. Such asymmetrical type progressive power lenses are disclosed in, e.g., Japanese Patent Publication Nos. 47-9626, 2-39767 and 64-5682.

In these conventional asymmetrical type progressive power lenses, improvement of the visual performance can be achieved to some extent but cannot be achieved sufficiently.

Namely, in the lens disclosed in Japanese Patent Publication No. 47-9626, the astigmatic difference distribution is symmetrical in the horizontal direction in the worn state, but lens refracting surfaces of portions for distant and near vision are spherical, so that it is impossible to widen the width of the clear vision area of an intermediate portion connecting the portions for distant and near vision smoothly.

In the lens disclosed in Japanese Patent Publication No. 64-5682, in consideration of movement of the lines of sight when both eyes look at an object in the state with the lenses worn, the astigmatic difference distribution is made symmetrical in the horizontal direction within 15 mm from the principal meridional curve respectively toward the left and right sides in an area where the principal meridional curve is displaced toward the nasal side. Accordingly, with respect to movement of the lines of sight at the time of looking at an object, the absolute values of the astigmatic differences to the respective left and right eyes become approximately equal. However, the density of the astigmatic differences becomes low on the temporal side region while it becomes high on the nasal side region. As a result, fluctuation and distortion of an image are felt much more in the side areas of the intermediate portion close to the clear vision area thereof where the density of the astigmatic differences is highest.

In the lens disclosed in Japanese Patent Publication No. 2-39767, the astigmatic differences at a pair of points spaced the same distance away in the horizontal or vertical direction from an arbitrary point on the principal meridional line are made approximately equal over the entire lens refracting surface. However, since the widths of the clear vision areas of portions for distant and near vision are made large, the width of the clear vision area of an intermediate portion is narrowed and the value of the maximum astigmatic difference is enlarged. In the above conventional asymmetrical type progressive power lenses, visual performance is secured to some extent but is not yet sufficient for practical use.

SUMMARY OF THE INVENTION

It is an object of the present invention to provide an asymmetrical type progressive power lens capable of eliminating inconveniences regarding the above conventional astigmatic difference distributions, obtaining wide and stable clear vision areas in an intermediate portion and a portion for near vision, reducing the value of the maximum astigmatic difference, obtaining a sufficiently wide clear vision area in a portion for distant vision, and avoiding discomfort in side areas.

In order to achieve the above object, a progressive power lens of the present invention has, along a principal meridional curve dividing a lens refracting surface into a nasal side region and a temporal side region, a portion F for distant vision having a refracting power corresponding to a distant view, a portion N for near vision having a refracting power corresponding to a near view and an intermediate portion P, located between the portion for distant vision and the portion for near vision, for continuously connecting the refracting powers of the portions for distant and near vision, wherein the principal meridional curve is displaced with respect to a vertical direction in the state with the lens worn toward a nasal side in the intermediate portion P and the portion N for near vision, and an astigmatic difference distribution in a horizontal direction in the worn state is symmetrical with respect to the principal meridional curve in the intermediate portion P and asymmetrical with respect to the principal meridional curve in the section N for near vision.

In a preferred embodiment of the present invention, the astigmatic difference distribution in the horizontal direction in the worn state is asymmetrical with respect to the principal meridional curve in the section F for distant vision. More specifically, the astigmatic difference distribution in either the portion N for near vision or the portion F for distant vision is sparse in the temporal side region rather than in the nasal side region and a clear vision area in either the section N for near vision or the section F for distant vision is wider in the temporal side region than in the nasal side region.

The present invention is for the purpose of finding an optimum distribution of astigmatic differences on a refracting surface and achieving optimum aberration balance over the entire refracting surface, in a progressive power lens having, along a principal meridional curve dividing a lens refracting surface into a nasal side region and a temporal side region, a portion F for distant vision having a refracting power corresponding to a distant view, a portion N for near vision having a refracting power corresponding to a near view and an intermediate portion P, located between the portion for distant vision and the portion for near vision, for continuously connecting the refracting powers of the portions for distant and near vision, as shown in FIG. 2.

Specifically, in the present invention, the optimum astigmatic difference distribution is symmetrical with respect to the principal meridional curve in the intermediate portion P and asymmetrical with respect to the principal meridional curve in the portion N for near vision. Further, it is preferable to make the astigmatic difference distribution in the section N for near vision and the section F for distant vision sparse on the temporal side rather than on the nasal side.

In general, in an asymmetrical type progressive power lens, an intermediate portion P and a portion N for near vision are asymmetrical with respect to a principal meridional curve and as is apparent from FIG. 2, the respective areas thereof on the nasal side are different from those on the temporal side. From the viewpoint of aberration correction, it is disadvantageous to perform aberration correction in the nasal side region having a small area while it is advantageous to perform aberration in the temporal side region having a large area. If the astigmatic difference distribution is made symmetrical in the horizontal direction with respect to the principal meridional curve in such an asymmetrical type progressive power lens, the astigmatic difference distribution on the temporal side is made to coincide with the dense astigmatic difference distribution on the nasal side. Now, the horizontal symmetry (symmetry in the horizontal direction with respect to the principal meridional curve) of the astigmatic difference distribution of the asymmetrical type progressive power lens will be considered.

First, when the astigmatic differences are structured to be symmetrical in the horizontal direction in the section N for near vision, i.e., the astigmatic difference distributions of the respective nasal and temporal side regions are made to be approximately symmetrical with respect to the principal meridional curve, more than permissible astigmatic difference is imparted to the temporal side region, so that the width of the clear vision area is limited considerably. Man's field of view is larger on the temporal side than on the nasal side. Therefore, when the clear vision area on the temporal side is designed to be large, it is possible to obtain a wider field of view of both eyes formed by overlapping a field of view of the left eye with a field of view of the right eye when looking at a near view.

Thus, it is effective to widen the clear vision area of the portion for near vision on the temporal side to widen the width of the field of view to a near view thereby to achieve preferable visual performance. As mentioned above, in the portion N for near vision of the asymmetrical type progressive power lens, since the area of the temporal side region is larger than that of the nasal side region, it is easy to widen the clear vision area on the temporal side as well as to make the astigmatic difference distribution sparse on the temporal side.

Next, as the intermediate section P is the region where the focal length (or refracting power) is changed progressively, the astigmatic difference distribution is most dense in side areas of the intermediate portion P close to the clear vision area thereof. That is, there is a limitation on the width of the clear vision area of the intermediate portion P. The fact that the lens aberrations are concentrated on the side areas of the progressive power range (i.e., the intermediate portion P) of the progressive power lens is an unavoidable characteristic of the progressive power lens. Therefore, the subject of how to improve visual performance of the progressive power lens depends on the structure of the lens aberration distribution in these areas where aberrations tend to be concentrated.

When looking an object through the intermediate portion P with both eyes, it is preferable for the left and right eyes to use an area along the center of the clear vision area, i.e., an area along the principal meridional curve. In order to widen the width of the clear vision area of the intermediate portion P thereby to achieve preferable visual performance at the time of looking at an object with both eyes, it is effective to make the densities of the astigmatic difference distributions in both side areas of the intermediate portion P symmetrical with respect to the principal meridional curve and low and to reduce the value of the maximum astigmatic difference to as small as possible.

For keeping the horizontal symmetry of the astigmatic difference distribution in the intermediate portion P, the asymmetry of the astigmatic difference distribution in the horizontal direction in the portion F for distant vision occurs inevitably. However, the horizontal symmetry of the astigmatic difference distribution in the section F for distant vision is effective only at the time when looking at a distant view at infinity with both eyes. When looking at objects with both eyes in daily life, the objects are usually located not at infinity but at limited distances. Therefore, when in an area in the vicinity of the eye point E for distant vision, the clear vision area on the temporal side is made wider than that on the nasal side in a similar manner to the portion N for near vision, the field of view of both eyes can be enlarged.

Thus, in order to optimize visual performance at the time of looking at an object with both eyes while wearing the progressive power lenses, it was found that it is important to make the astigmatic difference distribution symmetrical with respect to the principal meridional curve in the intermediate portion P and asymmetrical with respect to the principal meridional curve in the portion N for near vision and the portion F for distant vision.

As described above, according to the asymmetrical type progressive power lens of the present invention, while the astigmatic difference distribution on the refracting surface is made asymmetrical in the portion N for near vision and sparse on the temporal side thereof, the clear vision area can be widened in the vicinity of the eye point for near vision (the center ON of the portion for near vision) and especially on the temporal side. Also, the field of view of both eyes with respect to near views can be enlarged as shown in FIG. 5 and the concentration of the astigmatic differences in the side areas can be mitigated. Further, the value of the maximum astigmatic difference can be reduced and the gradient of the astigmatic differences can be made gentle while the clear vision area in the vicinity of the eye point for near vision is widened.

Also, as the astigmatic difference distribution of the refracting surface is symmetrical in the intermediate portion P, the gradient of the astigmatic differences in the horizontal direction can be made gentle and the width of the clear vision area can be widened.

Further, in the portion F for distant vision, the astigmatic difference distribution of the refracting surface is asymmetrical so as to make the clear vision area wider on the temporal side. Therefore, the clear vision area around the eye point E for distant vision is kept sufficiently wide and it is possible to realize a shape of a refracting surface such that the connection between the portion F for distant vision and the intermediate portion P is made smoothly.

Thus, the wider clear vision area can be obtained in looking at an object with both eyes, yet the fluctuation and distortion of an image in the side areas can be limited to a minimum level.

DESCRIPTION OF THE PREFERRED EMBODIMENTS

An embodiment of the present invention will be described with reference to the accompanying drawings. Performance evaluation were conducted for an asymmetrical type progressive power lens of the embodiment of the present invention having the above-mentioned refracting surface shape. The result is shown as isoastigmatic difference curves in FIG. 6. The isoastigmatic difference curves are plotted by 0.5 diopter increments. In the asymmetrical type progressive power lens of this embodiments, the base curve of a portion F for distant vision is 3.5 diopters and the additional power is 2.5 diopters.

Figure 1:
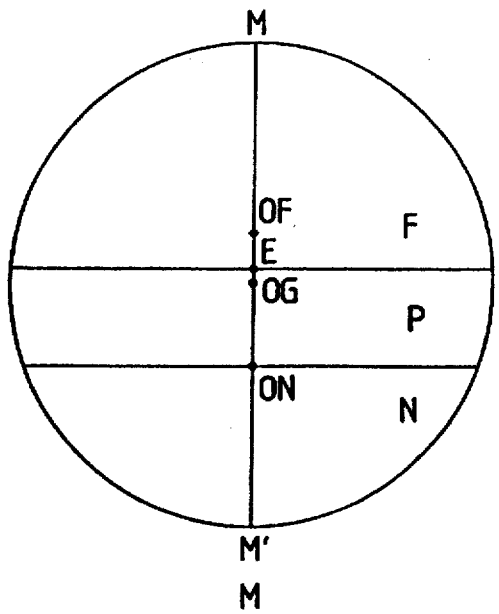
FIG. 1 is a schematic plan view showing divisions of regions of a conventional symmetrical type progressive power lens.
Figure 2:
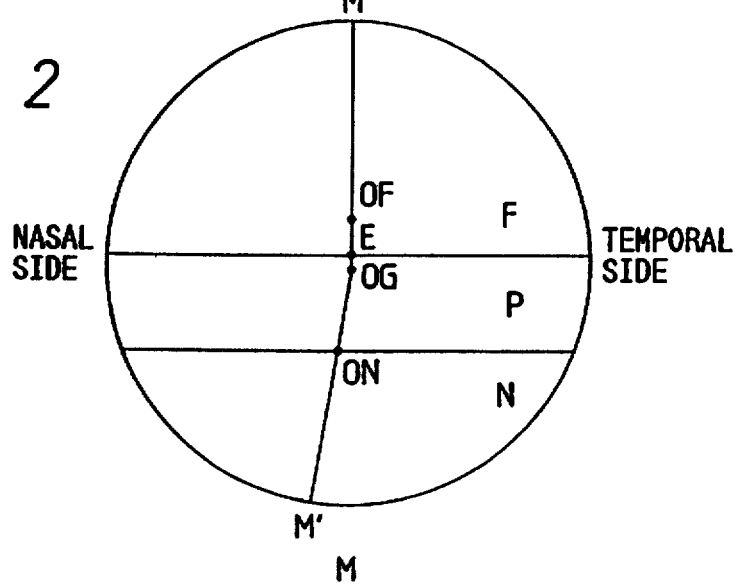
FIG. 2 is a schematic plan view showing divisions of regions of an asymmetrical type progressive power lens of the present invention.
Figure 3:
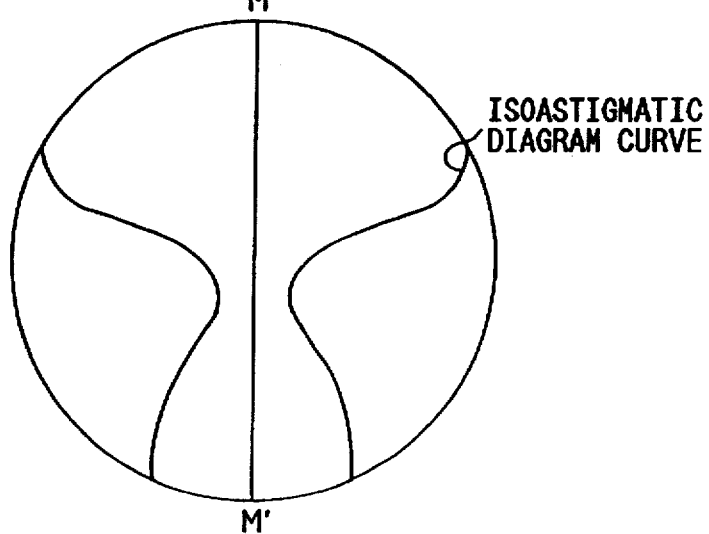
FIG. 3 is a diagram showing isoastigmatic difference curves of the conventional symmetrical type progressive power lens.
Figure 4:
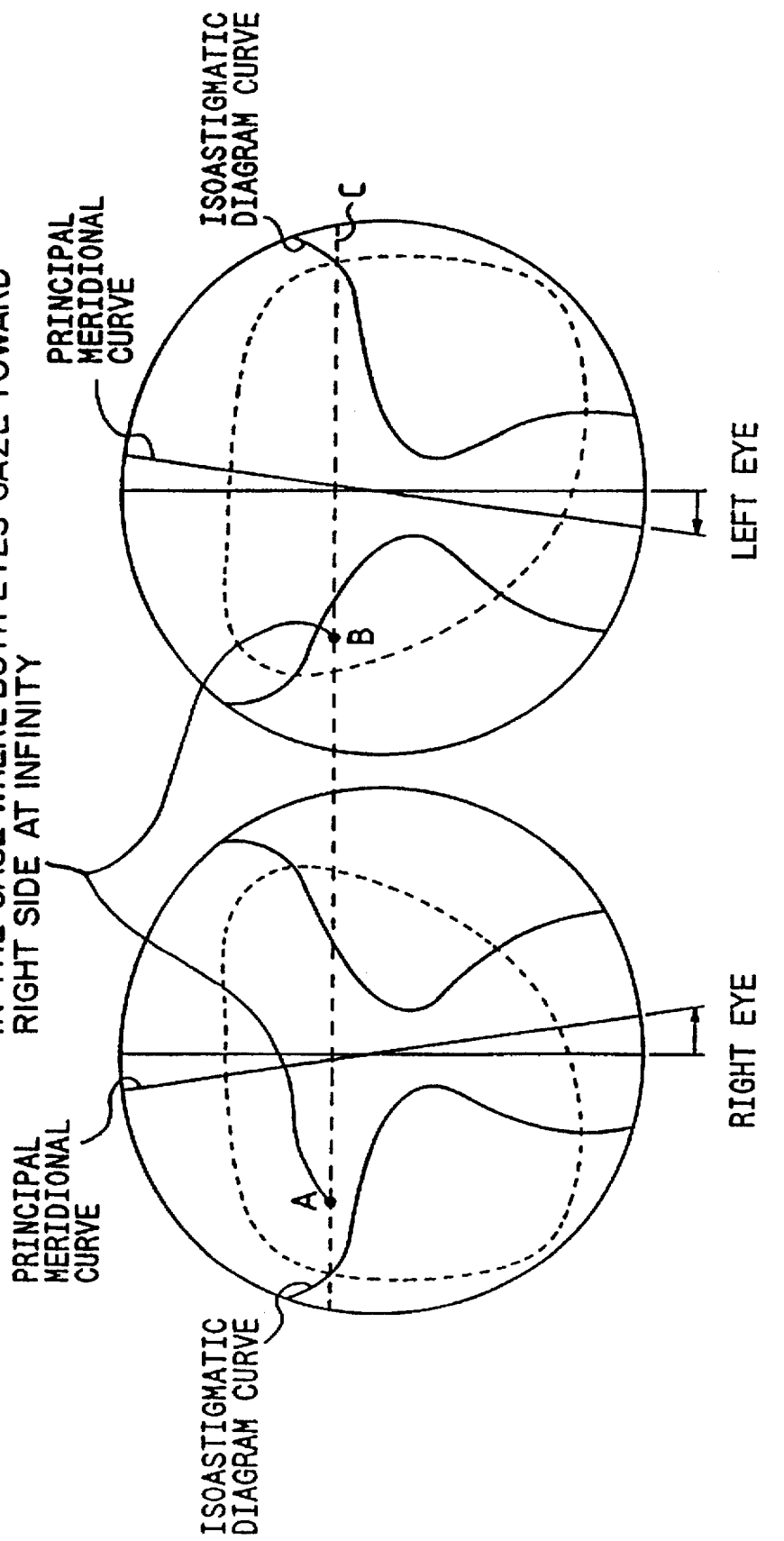
FIG. 4 is an explanatory diagram showing the conventional symmetrical type progressive power lenses in the worn state.
Figure 5:
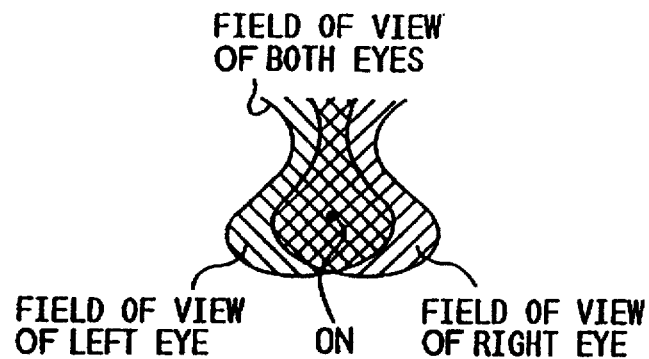
FIG. 5 is a diagram conceptually showing a clear vision area of a portion for near vision of the progressive power lens of the present invention when looking at an object through the portion for near vision with both eyes.
Figure 6:
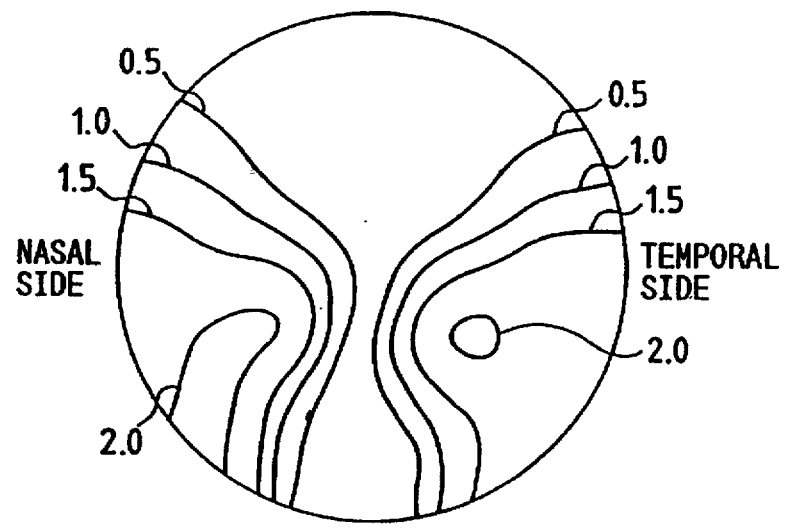
FIG. 6 is a diagram showing isoastigmatic difference curves of an asymmetrical type progressive power lens of an embodiment of the present invention.

As is apparent from FIG. 6 considered in conjunction with FIG. 2, clear vision areas (ranges with an astigmatic difference of 0.5 diopter or less) of the portion F for distant vision and the portion N for near vision are made larger on the temporal side (right side in the drawing). Also, the gradient of the astigmatic differences is gentle on the temporal side rather than on the nasal side in the portion N for near vision, so the density of the astigmatic differences is low on the temporal side.

In general, when the additional power is 2.5 diopters in a conventional progressive power lens, the value of the maximum astigmatic difference is 2.5 diopters or more. On the other hand, in the asymmetrical type progressive power lens of this embodiment, the value of the maximum astigmatic difference is reduced to be 2.0 diopters.

Further, the width of the clear vision area of the intermediate portion P is large.

It is difficult to understand the distribution of the astigmatic differences of the intermediate portion P in the horizontal direction in the worn state from the isoastigmatic difference diagram in FIG. 6. Therefore, the absolute values of the astigmatic differences of points spaced the same distance away from the principal meridional curve respectively toward the temporal and nasal sides in the horizontal direction in the worn state were evaluated in horizontal positions of an approximately central portion of the intermediate portion P (horizontal positions located respectively 6 mm and 8 mm downward (toward the portion N for near vision) from the geometric center OG). The result is shown in the following Table 1. In the Table 1, H represents the distance (mm) from the principal meridional curve in the horizontal direction, and L represents the absolute value (diopter) of the astigmatic difference.

is made sufficiently wide for practical use, the clear vision areas of the intermediate portion and the portion for near vision can be made wide and stable and the fluctuation and distortion of an image can be reduced in the side areas. Thus, the asymmetrical type progressive power lens with preferable aberration balance can be realized.

Therefore, even a user who wears these progressive lenses for the first time would not have an uncomfortable feeling.

What is claimed is:

1. An asymmetrical progressive power lens comprising, along a principal meridional curve dividing a lens refracting surface into a nasal side region and a temporal side region: a portion for distant vision having a refracting power corresponding to a distant view; a portion for near vision having a refracting power corresponding to a near view; and an intermediate portion, located between said portion for distant vision and said portion for near vision, for continuously connecting the refracting powers of said portions for distant and near vision, wherein said principal meridional curve is displaced, with respect to a vertical direction in a worn state toward the nasal side in said intermediate portion and said portion for near vision, and an astigmatic difference distribution in a horizontal direction in the worn state is symmetrical with respect to said principal meridional curve in said intermediate portion and asymmetrical with respect to said principal meridional curve in said portion for near vision.

2. An asymmetrical progressive power lens according to claim 1, wherein said astigmatic difference distribution is sparser on the temporal side of said portion for near vision than on the nasal side thereof.

3. An asymmetrical progressive power lens according to claim 2, wherein a clear vision area of said portion for near vision is wider on the temporal side than on the nasal side.

TABLE 1

| | nasal side | | | | | | temporal side | | | |
|---|---|---|---|---|---|---|---|---|---|---|
| (horizontal position located 6 mm downward from the geometric center) | | | | | | | | | | |
| H | −30 | −24 | −18 | −12 | −6 | +6 | +12 | +18 | +24 | +30 |
| L | 2.00 | 1.85 | 1.91 | 2.08 | 1.64 | 1.62 | 2.03 | 1.92 | 1.87 | 1.87 |
| (horizontal position located 8 mm downward from the geometric center) | | | | | | | | | | |
| H | −30 | −24 | −18 | −12 | −6 | +6 | +12 | +18 | +24 | +30 |
| L | 1.99 | 1.85 | 1.97 | 2.11 | 1.62 | 1.66 | 2.08 | 1.91 | 1.86 | 1.88 |

From the Table 1, the maximum difference of the absolute values of the astigmatic differences of points spaced the same distance away from the principal meridional curve in the horizontal direction is 0.13 diopter. This value is sufficiently small and then it can be said that the astigmatic difference distribution is approximately symmetrical with respect to the principal meridional curve.

When the additional power is 2.5 diopters, the value of the maximum astigmatic difference is approximately 2.5 diopters in the conventional progressive power lens, as mentioned above, but it is limited to approximately 2.0 diopters in the asymmetrical type progressive power lens of this embodiment.

Figure 7:
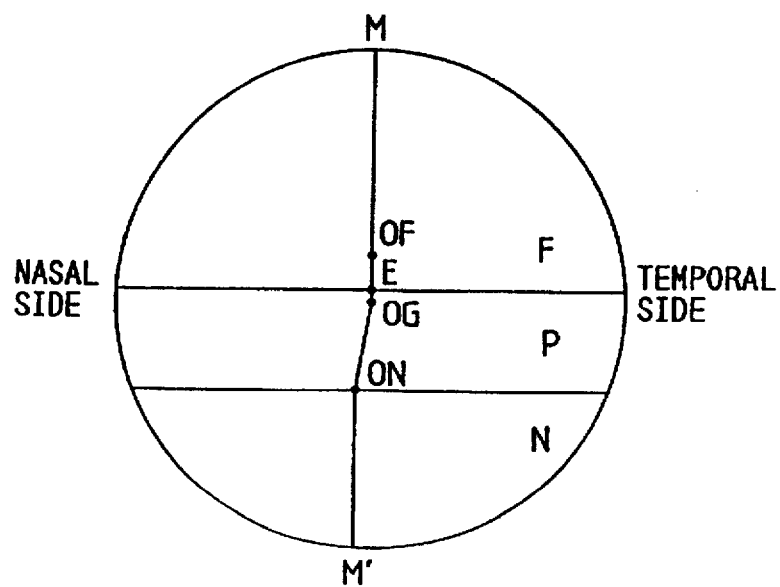
FIG. 7 is a schematic plan view showing divisions of regions of an asymmetrical type progressive power lens of another embodiment of the present invention.

Although the present invention is described by the asymmetrical progressive power lens whose principal meridional curve MM' is linear, as shown in FIG. 2, the present invention is applicable to an asymmetrical progressive power lens whose principal meridional curve MM' is curved toward the nasal side in the shape of a letter S, as shown in FIG. 7.

As described above, according to the present invention, while the clear vision area of the portion for distant vision 4. An asymmetrical progressive power lens according to claim 3, wherein said astigmatic difference distribution is asymmetrical with respect to said principal meridional curve in said portion for distant vision.

5. An asymmetrical progressive power lens according to claim 4, wherein a clear vision area of said portion for distant vision is wider on the temporal side than on the nasal side.

6. An asymmetrical progressive power lens according to claim 1, wherein a clear vision area of said portion for near vision is wider on the temporal side than on the nasal side.

7. An asymmetrical progressive power lens according to claim 6, wherein said astigmatic difference distribution is asymmetrical with respect to said principal meridional curve in said portion for distant vision.

8. An asymmetrical progressive power lens according to claim 7, wherein a clear vision area of said portion for distant vision is wider on the temporal side than on the nasal side.

9. An asymmetrical progressive power lens according to claim 1, wherein said astigmatic difference distribution is asymmetrical with respect to said principal meridional curve in said portion for distant vision.

10. An asymmetrical progressive power lens according to claim 9, wherein a clear vision area of said portion for distant vision is wider on the temporal side than on the nasal side.

11. An asymmetrical progressive power lens according to claim 2, wherein said astigmatic difference distribution is asymmetrical with respect to said principal meridional curve in said portion for distant vision.

12. An asymmetrical progressive power lens according to claim 11, wherein a clear vision area of said portion for distant vision is wider on the temporal side than on the nasal side.

13. An asymmetrical progressive power lens comprising, along a principal meridional curve dividing a lens refracting surface into a nasal side region and a temporal side region: a portion for distant vision having a refracting power corresponding to a distant view; a portion for near vision having a refracting power corresponding to a near view; and an intermediate portion, located between said portion for distant vision and said portion for near vision, for continuously connecting the refracting powers of said portions for distant and near vision, wherein said principal meridional curve is displaced, with respect to a vertical direction in a worn state, toward the nasal side in said intermediate portion and said portion for near vision, and an astigmatic difference distribution in a horizontal direction in the worn state is symmetrical with respect to said principal meridional curve in said intermediate portion and, in said portion for near vision, the width in the horizontal direction of a clear vision area on the nasal side of said principal meridional curve differs from the width in the horizontal direction of a clear vision area on the temporal side of said principal meridional curve.

* * * * *